G. SARGL.
ILLUMINATED WATER GAGE.
APPLICATION FILED APR. 27, 1916.

1,273,413.

Patented July 23, 1918.

UNITED STATES PATENT OFFICE.

GOTHARD SARGL, OF EAST GRAND FORKS, MINNESOTA.

ILLUMINATED WATER-GAGE.

1,273,413.	Specification of Letters Patent.	Patented July 23, 1918.

Application filed April 27, 1916. Serial No. 94,015.

*To all whom it may concern:*

Be it known that I, GOTHARD SARGL, a citizen of the United States, residing at East Grand Forks, in the county of Polk, State of Minnesota, have invented an Improvement in Illuminated Water-Gages, of which the following is a specification.

At the present time boilers for power and heating plants are being made of such large dimensions and the water gage is located at such an elevation, that it is difficult for a person standing on the floor to determine, by observation, the level of the contents of the gage glass. Quite frequently the gages are arranged twenty or more feet above the floor.

At the top of the column of water or other liquid contained in the gage glass there is formed what is commonly known as the meniscus, and in case the contents of the glass is water or some spirituous liquid, this meniscus is concave. I have discovered than when rays of light strike the meniscus they are reflected, and in case they strike the underside of the meniscus, they are reflected downward, and a person standing on the floor and looking upward can determine the location of the meniscus by observation, and the location of the meniscus indicates the top level of the column in the gage glass.

My invention, therefore, has for its object the provision of means, such for instance as electric lamps arranged in juxtaposition to or below the plane of the gage and adapted to throw their rays of light against the meniscus in the gage glass, whereupon they are reflected, and a person is thereby enabled to determine by observation, the location of the meniscus, as, for instance, in case the rays of light are directed against the underside of the meniscus, they will be reflected downward, and a person standing below the gage, can, by observation, determine the relative location of the meniscus.

Figure 1:
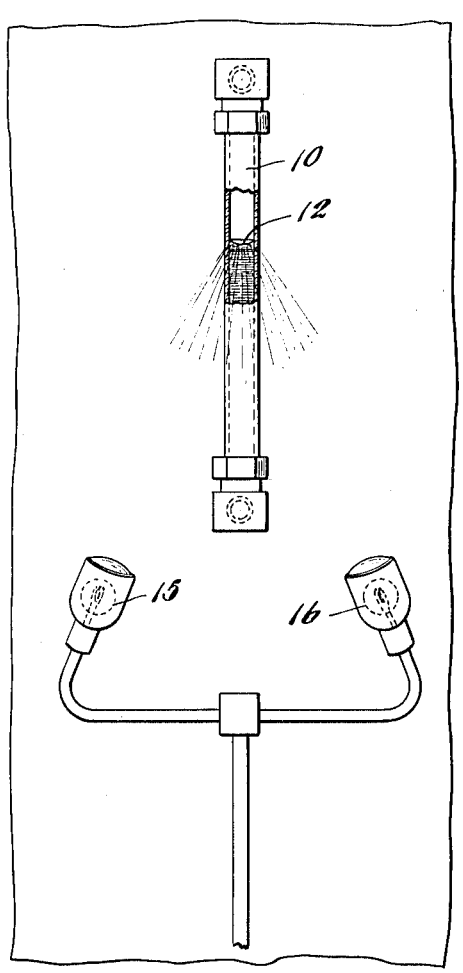
Figure 1 is a front view of a water gage, with electric lamps arranged below the plane of the gage to direct their rays of light upward against the bottom of the meniscus.
Figure 2:
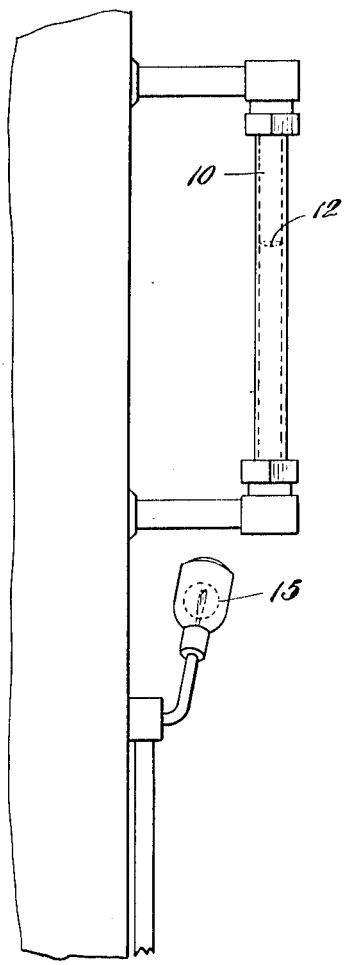
Fig. 2 is a side elevation of the same.

10 represents the usual glass tube of a water gage adapted to contain water or other liquid, to indicate by the height of the column, the water level of the boiler, or in case the gage is connected with a tank or some other reservoir, it will indicate the level of the contents thereof. 12 indicates the concave meniscus which is formed at the top of the column of liquid contained in the gage class. 15 and 16 represent two electric lamps of any suitable construction which are arranged in the plane below the gage and adapted to throw their rays of light upward against the underside of the meniscus. The rays of light are concentrated on the surface of the meniscus, or reflected by the meniscus in a downward direction, so that a person can, by observation, determine the location of the meniscus, which, it will be understood, is the top or indicating level of the column.

The electric lights may be adapted to be turned on when desired, or kept lighted, or in lieu thereof, any other source or sources of light rays may be employed, and, furthermore, the light rays may be colored, if desired. The reflection of the light rays may come directly to the observer from the meniscus, or may be reflected or refracted in some manner to be most noticeable to the observer.

I may employ a reversal of the arrangement here shown and described, using the upper surface of the meniscus as a reflector for the rays of light.

I claim:—

1. A gage as characterized having a transparent tube for holding liquid; and means for concentrating a ray of light from a point laterally disposed from the column of liquid in the tube and angularly related to the top surface thereof for producing refraction of said ray from the upper surface of said column.

2. A gage as characterized comprising a transparent tube; a column of liquid therein; an electric light laterally spaced from the base of said column; and a reflector for directing the rays of said light upward at an angle to said column for refracting said light from the upper surface of said column.

In testimony whereof, I have signed my name to this specification in the presence of two subscribing witnesses.

GOTHARD SARGL.

Witnesses:
 LIVINA HERNANDEZ,
 C. V. PORTER, Jr.